(12) United States Patent
Breault

(10) Patent No.: US 10,821,470 B2
(45) Date of Patent: Nov. 3, 2020

(54) SYRINGE WITH PISTON ASSEMBLY

(71) Applicant: Henkel IP & Holding GmbH, Duesseldorf (DE)

(72) Inventor: John P. Breault, New Britain, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 16/433,566

(22) Filed: Jun. 6, 2019

(65) Prior Publication Data

US 2019/0314855 A1   Oct. 17, 2019

Related U.S. Application Data

(63) Continuation of application No. PCT/US2017/064856, filed on Dec. 6, 2017.

(60) Provisional application No. 62/430,953, filed on Dec. 7, 2016.

(51) Int. Cl.
*B05C 17/005* (2006.01)

(52) U.S. Cl.
CPC .. *B05C 17/00579* (2013.01); *B05C 17/00506* (2013.01); *B05C 17/00553* (2013.01); *B05C 17/00593* (2013.01)

(58) Field of Classification Search
CPC ........ B05C 17/00579; B05C 17/00506; B05C 17/00553; B05C 17/00593
USPC ......................................................... 222/137
See application file for complete search history.

(56) References Cited

U.S. PATENT DOCUMENTS

| | | | | |
|---|---|---|---|---|
| 4,492,576 A | * | 1/1985 | Dragan | A61C 9/0026 433/90 |
| 6,458,095 B1 | * | 10/2002 | Wirt | A61B 17/00491 222/137 |
| 6,569,113 B2 | * | 5/2003 | Wirt | A61B 17/00491 222/137 |
| 6,648,852 B2 | * | 11/2003 | Wirt | A61B 17/00491 604/191 |
| 2008/0142552 A1 | * | 6/2008 | Hemsen | B05C 11/1002 222/334 |

(Continued)

FOREIGN PATENT DOCUMENTS

| | | |
|---|---|---|
| CN | 204655681 | 9/2015 |
| EP | 1602415 | 12/2005 |

(Continued)

OTHER PUBLICATIONS

International Search Report issued in connection with International Patent Application No. PCT/US2017/064856 dated Mar. 6, 2018.

*Primary Examiner* — Vishal Pancholi
(74) *Attorney, Agent, or Firm* — Steven C. Bauman

(57) ABSTRACT

A syringe assembly contains a fluid material, preferably two reactive fluid materials. The syringe assembly includes a syringe body having at least one barrel and a piston assembly movable within the barrel. An activatable plunger is in contact with the piston assembly effects dispensing movement of the piston assembly. The piston assembly includes an outer piston in sealed engagement with the barrel and an inner piston in sealed engagement with the outer piston. The inner piston is movable within the outer piston with and against the bias of a spring to maintain the inner piston in contact with the reactive material in the barrel upon thermal expansion and contraction of the reactive material.

11 Claims, 3 Drawing Sheets

(56) References Cited

U.S. PATENT DOCUMENTS

2012/0041481 A1 2/2012 Daniloff et al.

FOREIGN PATENT DOCUMENTS

| EP | 2275039 | 1/2011 |
| WO | 9103269 | 3/1991 |

* cited by examiner

SYRINGE WITH PISTON ASSEMBLY

FIELD OF THE INVENTION

The present invention relates generally to dispensing syringes for discharging a fluid adhesive. More particularly, the present invention relates to a dual piston assembly for simultaneously discharging a plurality of reactive materials with a twin barrel syringe.

BACKGROUND OF THE INVENTION

Twin barrel syringes are generally used to dispense two reactive fluids such as two-component adhesive sealants and coatings where the syringe both mixes the reactive products and dispenses the mixed product. Syringes of this type typically include two barrels, each for housing one of the reactive components. A plunger at one end of the barrels is used to simultaneously dispense two reactive components into a static mixer which mixes the reactive components and dispenses the mixed components through a dispense tip.

Dual barrel syringes of this type are particularly useful in dispensing reactive components such as cyanoacrylate (CA) and epoxy which are to be mixed together to form a hybrid adhesive. In order to assure that the proper mix ratio is maintained through the static mixer, it is advantageous not to introduce air bubbles into the barrel before or during dispensing. Such air bubbles could have a negative effect on the mix ratio of the two part adhesive resulting in poor adhesive performance. This is particularly evident with the CA portion of the adhesive as CA has a large coefficient of thermal expansion which causes air to be introduced into the barrel. As the CA is exposed to elevated temperature, its volume expands and forces the piston in the barrel up. Once it is cooled, the volume contracts, however, the piston may not return to its position in contact with the CA thus resulting in air being entrapped between the piston and the CA. In these cases, it is necessary to purge the air from the barrel to reestablish the proper mix ratio.

SUMMARY OF THE INVENTION

A syringe assembly is provided for containing and dispensing a fluid material.

More particularly, the syringe assembly dispenses at least two reactive materials. The syringe assembly includes a syringe body having at least a pair of barrels each having an open upper end and lower open end in communication with an outlet opening for accommodating and dispensing the reactive materials. A piston assembly is movably positioned within each of the barrels and is movable to dispense the material through the outlet opening. An activatable plunger is in contact with the pistons to effect dispensing movement of the piston assemblies. At least one of the piston assemblies includes an outer piston in sealed engagement with the barrel and an inner piston in sealed engagement with the outer piston. The inner piston is movable within the outer piston with and against the bias of a spring to maintain the inner piston in contact with the reactive material in the barrel upon thermal expansion and contraction of the reactive material.

DETAILED DESCRIPTION OF THE INVENTION

Figure 1:
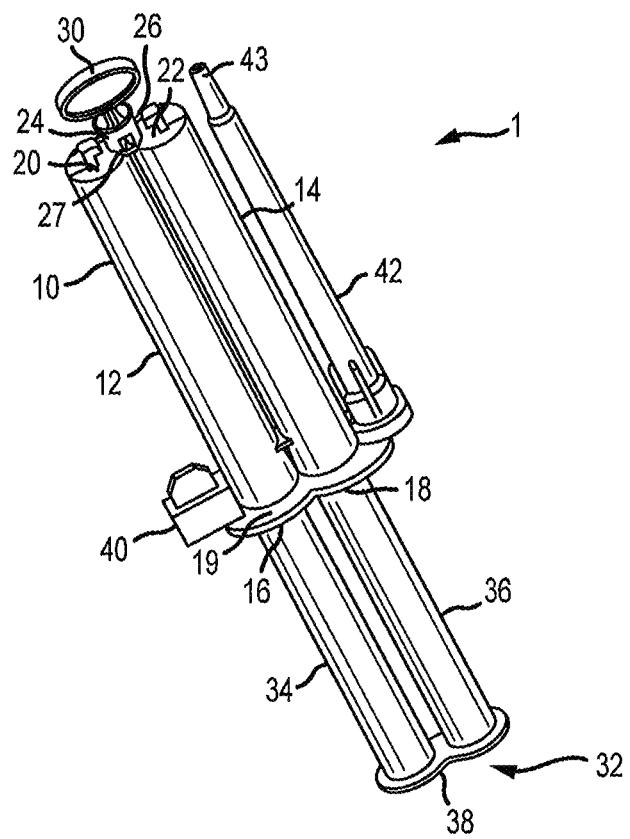
FIG. 1 is a perspective showing of a syringe assembly used in accordance with the present invention.

The present invention provides a syringe assembly which is used to mix and dispense two reactive materials. While a dual barrel syringe is shown, it may be appreciated that the present invention may be used in combination with any plural number of syringe barrels.

It is also contemplated that the present invention may be used with a single barrel syringe. In such instance, it may be desirable to prevent entrapped air within a syringe barrel used to dispense a single fluid material such as a fluid adhesive.

The syringe assembly 1 of the present invention includes a syringe body 10 having two parallel elongate cylindrical hollow barrels 12 and 14 having respective open ends 16 and 18 joined by a transverse flange 19 and opposed ends 20 and 22 having outlets 24 and 26 merging into outlet 27. The barrels 12 and 14 are designed to accommodate reactive materials for dispensing through the outlets 24 and 26. A frangible tab 30 seals the outlets 24 and 26.

In use, the tab 30 is broken off to unseal the outlet 27 and permit the reactive materials in the barrel to be discharged. End cap 40 is provided for resealing the outlets 24 and 26.

A dual plunger assembly 32 includes plungers 34 and 36 which are joined at one end by a flange 38.

A static mixing element 42 is shown frangibly attached to the barrels 12 and 14. In use, the static mixer 42 is detached from the barrels 12 and 14 and attached to the outlets 24 and 26. The barrels 24, 26 each contain a respective one of the two reactive materials which when combined together by the static mixer 42 form a hybrid material.

In conventional fashion, the syringe assembly 1 is used by depressing the joined plungers 34 and 36 into the barrels 12 and 14 to discharge the reactive materials through the outlets 24 and 26 and into the static mixer 42 where the materials are mixed and dispensed through the dispensing tip 43 of the static mixer. As will be described in further detail hereinbelow, the barrels each contain a piston assembly in sealed engagement with the inside wall of the barrels to effect efficient displacement of the reactive materials through the barrels.

The present invention is particularly useful in dispensing two or more reactive materials such as cyanoacrylate (CA) and epoxy which are to be mixed together to form a hybrid fluid adhesive. As noted above, it is imperative that the proper mix ratio of the two components be maintained through the static mixer and during dispensing. In that regard, it is especially advantageous that air does not become introduced into the barrel before or during dispensing. One avenue in which air can become entrapped in the barrel is upon expansion and contraction of the material in the barrel due to temperature variation. This is especially prevalent with the use of the CA portion of the hybrid adhesive as CA has a large coefficient of thermal expansion which may cause air to be introduced into the barrel.

The present invention provides a piston assembly movably suspended in the barrel to push the adhesive through the barrel upon plunger actuation and which maintains sealed engagement with the material in the barrel throughout thermal expansion and contraction.

Figure 2:
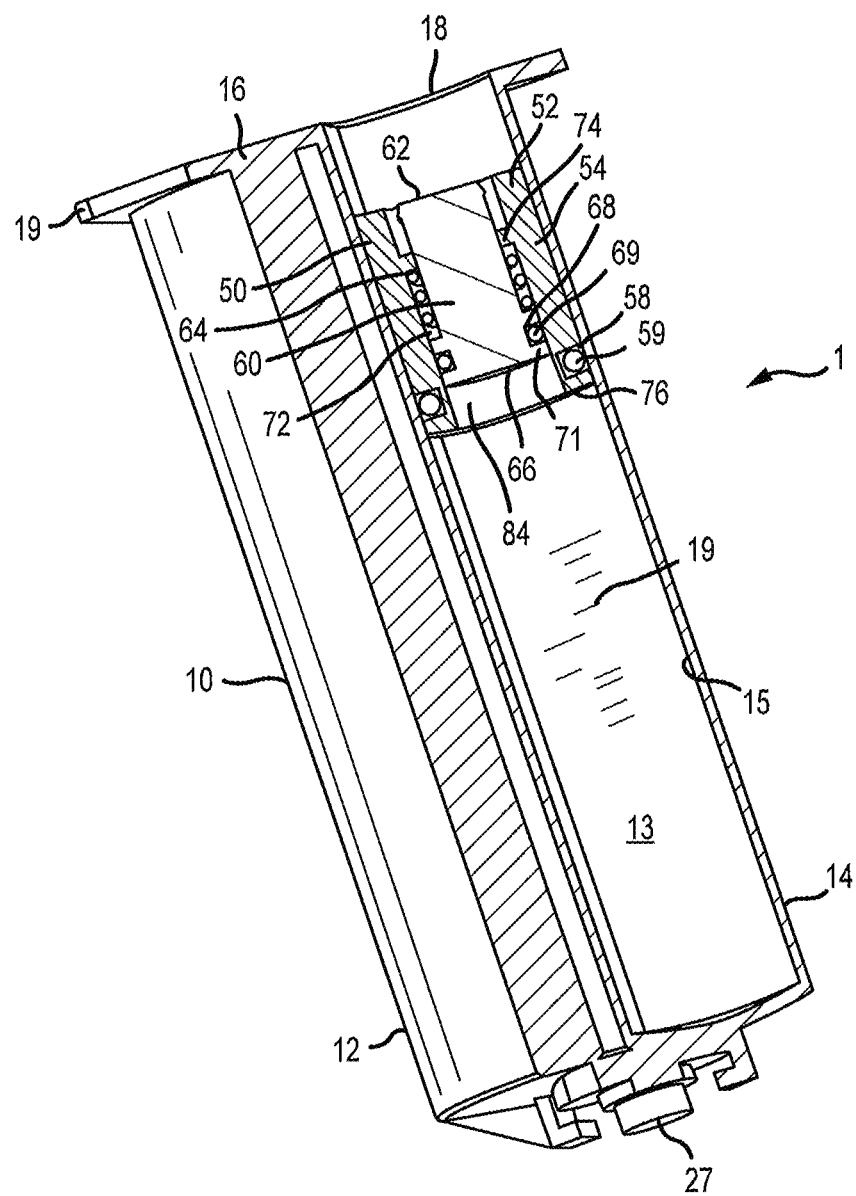
FIGS. 2 and 3 are perspective showings, partially in section, of the syringe barrels of FIG. 1 including the dual piston of the present invention.
Figure 3:
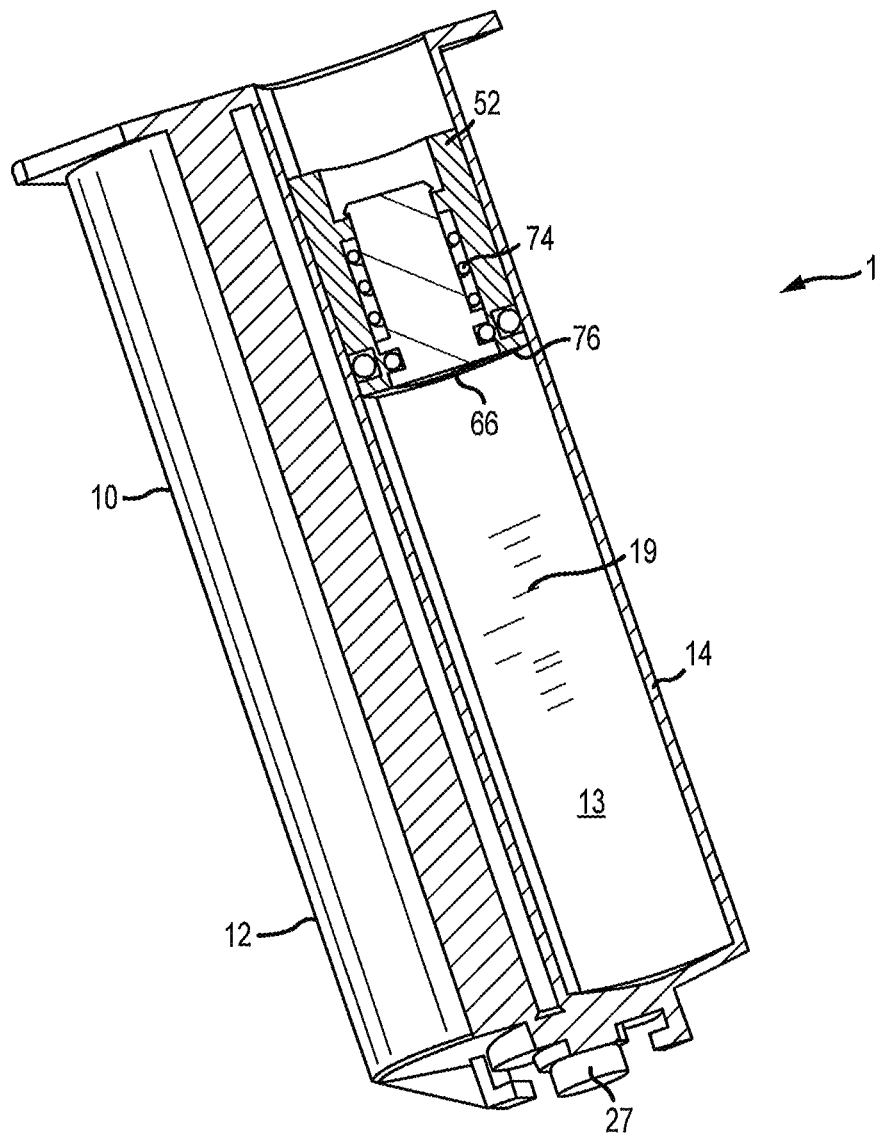

Referring now to FIGS. 2 and 3, the piston assembly 50 of the present invention is shown. In FIGS. 2 and 3, syringe body 10 is shown including the two parallel hollow cylindrical barrels 12 and 14. In the present illustrative showing, barrel 14 is cut away exposing the interior 13 thereof and the piston assembly 50 of the present invention. It may be appreciated that the other barrel 12 may also include an identical piston assembly 50, or in the alternative, a conventional piston, if air entrapment is not a concern.

Piston assembly 50 is generally of dual concentric construction including an outer piston 52 of generally hollow cylindrical construction. The cylindrical outer wall 54 of outer piston 52 is constructed to be in slidable engagement with the inner cylindrical wall 15 of barrel 14. At the lower end 56 of outer cylindrical wall 54, an annular undercut 58 is formed. The annular undercut opens outwardly to cylindrical wall 15 of barrel 14. An elastomeric seal 59 such as an O-ring may be positioned in the undercut 56 so as to provide sealed engagement between the outer cylindrical wall 54 of outer piston 52 and the inner cylindrical wall 15 of barrel 14. The outer piston 52 is movable under actuation of the plunger assembly 32 (FIG. 1) to move within the interior of barrel 14 to dispense the material contained within barrel 14 through the outlet 27 thereof.

Piston assembly 50 further includes an inner piston 60 which is generally of solid cylindrical construction which is movably positioned within outer piston 52. The inner piston 60 includes an upper end 62 which is contained within an annular upper wall 64 of outer piston 52 and is slidably movable therethrough. The lower end 66 of inner piston 60 includes an outwardly protruding annular undercut 68 opening to the outer piston 52. The undercut 68 contains an elastomeric seal 69, such as an O-ring, which provides a seal between the outer inner piston 60 and the outer piston 52. An elongate annular chamber 72 is provided between inner piston 60 and outer piston 52. A spring 74 which in the present illustrative embodiment is a coil spring, resides within the annular chamber 72 to provide spring biased movement between inner piston 60 and outer piston 52. The spring is captured between the annular upper wall 64 of outer piston 52 and the wall 71 defined by the outwardly protruding undercut 70 of the inner piston 60.

Referring specifically to FIG. 3, under the bias of spring 74, the inner piston 60 is positioned with respect to outer piston 52 so that its lower end 66 is flush with the lower end 76 of outer piston 52. In this position, both the outer piston and the inner piston are in contact with the material 19 contained within the interior 13 of barrel 14.

Referring specifically to FIG. 2, upon any temperature increase occasioned prior to dispensing of the materials, thermal expansion of the material is accommodated by movement of the inner piston 60 against the bias of spring 74. Movement of the inner piston 60 upward with respect to the outer piston 52 provides a chamber 84 for accommodating the expanded volume of material caused by the temperature variation. Thus, the lower end 80 of inner piston 60 is maintained in direct contact with the material during volume expansion.

Due to temperature variation, the material within the interior 13 of barrel 14 may contract and pull away from piston assembly 50. As it does, the inner piston 60 moves downward under the bias of spring 74 towards the lower end of outer piston 52 to the position shown in FIG. 3. This maintains the lower 80 of inner piston 60 in direct contact with the material contained within the interior 13 of barrel 14 thus preventing entrapment of air between the piston assembly 50 and the material therein.

While the invention has been described in relationship to the preferred embodiments, it will be understood by those skilled in the art that various changes may be made without deviating from the fundamental nature and scope of the invention as defined in the appended claims.

What is claimed:

1. A syringe assembly for containing and dispensing a fluid material comprising:
   a syringe body having at least one barrel, said barrel having an open upper end and a lower end in communication with an outlet opening for accommodating and dispensing said fluid material;
   a piston assembly movably positioned within said barrel, movable to dispense said material through said outlet opening; and
   an activatable plunger in contact with said piston assembly to effect dispensing movement of said piston assembly;
   said piston assembly including an outer piston in sealed engagement with said barrel and an inner piston in sealed engagement with said outer piston, said inner piston being movable within said outer piston with and against the bias of a spring to maintain said inner piston in contact with said fluid material in said barrel upon thermal expansion and contraction of said fluid material.

2. A syringe assembly of claim 1 wherein said outer piston is generally a hollow cylinder having an outer cylindrical wall in sealed engagement with an inner wall of said barrel.

3. A syringe assembly of claim 2 wherein said inner piston is a cylinder having an outer cylindrical wall in sealed engagement with an inner cylindrical wall of said outer piston.

4. A syringe assembly of claim 3 wherein said spring is positioned between said outer piston and said inner piston; and wherein said inner piston is movable against the bias of said spring upon thermal expansion of said fluid material and returnable under the bias of said spring upon contraction of said fluid material.

5. A syringe assembly of claim 1 wherein said syringe body includes at least two said barrels for dispensing at least two reactive materials including a piston assembly in each barrel, wherein at least one of said piston assemblies includes said outer piston and said inner piston.

6. A syringe assembly of claim 5 further including a static mixer attachable to the exit opening of said barrels and in communication therewith for receiving and mixing said reactive materials.

7. A syringe assembly of claim 6 wherein said static mixer include a dispensing tip for dispensing said mixed reactive materials.

8. A syringe assembly of claim 5 wherein said outer piston is generally a hollow cylinder having an outer cylindrical wall in sealed engagement with an inner wall of said barrel.

9. A syringe assembly of claim 8 wherein said inner piston is a cylinder having an outer cylindrical wall in sealed engagement with an inner cylindrical wall of said outer piston.

10. A syringe assembly of claim 9 wherein said spring is positioned between said outer piston and said inner piston; and wherein said inner piston is movable against the bias of said spring upon said thermal expansion of said reactive material and returnable under the bias of said spring upon contraction of said reactive material.

11. A syringe assembly of claim 1 wherein said spring is configured to bias said inner piston towards said lower end of said barrel.

* * * * *